United States Patent [19]

Fuji et al.

[11] Patent Number: 4,954,903
[45] Date of Patent: Sep. 4, 1990

[54] DIGITAL SIGNAL REPRODUCTION APPARATUS FOR READING MAGNETO-OPTICAL DISKS

[75] Inventors: Hiroshi Fuji; Takeshi Yamaguchi; Kunio Kojima; Toshihisa Deguchi; Shigeo Terashima; Tsuneo Fujiwara, all of Nara, Japan

[73] Assignee: Sharp Kabushiki Kaisha, Osaka, Japan

[21] Appl. No.: 245,771

[22] Filed: Sep. 19, 1988

[30] Foreign Application Priority Data

Sep. 21, 1987 [JP] Japan .................. 62-236757
Oct. 27, 1987 [JP] Japan .................. 62-270607

[51] Int. Cl.$^5$ .................................... G11B 5/09
[52] U.S. Cl. .................................... 360/46
[58] Field of Search .............. 360/46, 67, 68, 38.1; 369/59, 124; 358/336

[56] References Cited

U.S. PATENT DOCUMENTS

| 4,475,183 | 10/1984 | Marchant et al. | 369/59 |
| 4,480,276 | 10/1984 | Batey et al. | 360/46 |
| 4,686,586 | 8/1987 | Dutcher | 360/46 |
| 4,751,591 | 6/1988 | Fujimoto | 360/67 |
| 4,764,916 | 8/1988 | Mori | 369/59 |

FOREIGN PATENT DOCUMENTS

| 0220023 | 4/1987 | European Pat. Off. |
| 1259379 | 1/1968 | Fed. Rep. of Germany |
| 3604723 | 10/1986 | Fed. Rep. of Germany |
| 59-79409 | 5/1984 | Japan |
| 1284876 | 12/1986 | Japan |
| 6912924 | 1/1987 | Japan |
| 1005702 | 9/1965 | United Kingdom |

OTHER PUBLICATIONS

Laid-Open Japanese Patent Application No. 62-124645 dated Jun. 5, 1987.
Laid-Open Japanese Patent Application No. 62-129942 dated Jun. 12, 1962.
Laid-Open Japanese Patent Application No. 62-12924, English Patent Publication 1,005,702.

Primary Examiner—Vincent P. Canney
Attorney, Agent, or Firm—Birch, Stewart, Kolasch & Birch

[57] ABSTRACT

A digital signal reproduction apparatus includes a first differential circuit for differentiating a reproduction signal reproduced from a recording medium. This differential circuit outputs a first order differential signal and second differential circuit differentiates the first order differential signal of the reproduction signal and outputs a second order differential signal. A comparator compares the second order differential signal with a predetermined level to produce a window signal. A peak detecting circuit detects zero-cross points in the first order differential signal and outputs a peak detecting signal. A gate gates the peak detecting signal with the window signal to output a reproduction data signal.

3 Claims, 5 Drawing Sheets

DIGITAL SIGNAL REPRODUCTION APPARATUS FOR READING MAGNETO-OPTICAL DISKS

BACKGROUND OF THE INVENTION

1. FIELD OF THE INVENTION

The present invention relates to a digital signal reproduction apparatus for reproducing digital signals recorded on a recording medium such as a magneto-optical disc.

2. DESCRIPTION OF PRIOR ART

A magneto-optical disc has a magnetic thin film as a recording medium on the surface of the disk which has a magnetic anisotropy such that the axis of easy magnetization is oriented vertical to the surface of the film. Recording data onto the magnetic thin film or reproducing data from the magnetic thin film is performed by irradiating a laser beam, condensed into a diameter of about 1 µm, onto the film.

When recording data signals, a strong laser beam is irradiated onto the thin film. Due to this irradiation, the temperature of the irradiated spot on the thin film is raised locally to decrease the coercive force. Therefore, when a biased magnetic field is applied to the spot, the magnetization of the spot is inverted. Accordingly, if the strength of the laser beam or the direction of the biased magnetic field is controlled according to the data signals to be recorded, they are vertically recorded onto the thin film as dots having a diameter of the laser beam. When erasing the recorded signals, the method is substantially the same as the recording method.

Upon reproducing the data signals, a weaker laser beam than the recording beam is irradiated onto the magnetic thin film. When the laser beam irradiates a spot on the film, it is linearly polarized to have a polarization plane inclined according to the magnetized state of the spot by the magneto-optical effect (Faraday effect or Karr effect) and is reflected from the surface of the film. Therefore, if the inclination of the polarization plane can be detected by converting it into an electrical signal by an optical detector through an analyzer, the recorded data signal can be reproduced.

FIG. 3 is a schematic diagram of the reproduction system for the magneto-optical disc.

When a laser beam generated by an optical head 1 is irradiated onto the thin film of the magneto-optical disc 2, the irradiated beam is reflected toward the optical head 1. The reflected light beam is converted into a reproduction signal corresponding to the inclination of the polarization plane. The reproduction signal is transmitted to a data detecting circuit 3 and the recorded data signal is outputted as a reproduction data signal.

The conventional data detecting circuit 3 used for the above reproduction system will be described referring to FIGS. 4 and 5. As shown in the upper most row of FIG. 5, if the recording data signal S11 having a series of "0"and "1" is recorded on the thin film of the magneto-optical disc, the reproduction signal S12 generated from the recording data signal S11 has a waveform wherein each peak corresponds to "1" of the recording data signal S11. The reproduction signal S12 is inputted into a differential circuit 21, a comparative voltage generating circuit 22, a comparator 23 of the data detection circuit 3, respectively, as shown in FIG. 4. The differential circuit 21 differentiates the reproduction signal S12 and outputs a differential signal S13. The differential signal S13 is a waveform having zero-cross points corresponding to individual maximum and minimum values of the reproduction signal S12 as shown in FIG. 5. The differential signal S13 is inputted into a comparator 24. The comparator 24 compares the differential signal with a 0 V level and outputs a differential digital signal S15. Each trailing position of pulses of the differential digital signal S15 corresponds to a zero-cross point of the differential signal S13 at which it changes from a positive value to a negative value, and therefore, it corresponds to each peak point (maximum point in, the conventional example) of the reproduction signal S12. Namely, it represents a position corresponding to "1" of the recorded recording data signal S11. Therefore, if the trailing position is detected by a trailing detecting circuit 25, a peak detecting signal corresponding to "1" of the recording data signal S11 can be obtained.

However, when "0"continues in the recording data signal S11, and therefore, the reproduction signal S12 is held at the minimum level for a while, the differential signal S13 is held at the zero-cross level for a relatively long time as indicated by a circle E of FIG. 5. In this state, noises are apt to cause in the differential digital signal S15 and the peak detecting signal S17. Therefore, it becomes necessary to remove the noise contained in the peak detecting signal S17 in order to pick up only pulse representing the peak point of the reproduction signal S12. In order for this to be realized, the comparative voltage generating circuit 22 generates one more comparative voltage S12' based upon the inputted reproduction signal S12 input. The comparative voltage generating circuit 22 comprises a low pass filter or an envelope detecting circuit to output the comparative voltage S12'and outputs a threshold voltage for detecting the vicinity of each peak of the reproduction signal S12 as the comparative voltage S12'. Next, the comparator 23 compares the reproduction signal S12 with the comparative voltage S12' and outputs a window signal S16 representing the vicinity of the peak of the reproduction signal S12. An AND gate 26 then gates the peak detecting signal S17 with the window signal S16, thus unnecessary noises included in the peak detecting signal S17 are masked. As the result, the reproduction data signal S18 having only pulses corresponding to "1" in the recorded data signal S11 can be obtained.

However, in the conventional data detecting circuit 3, the level margin of the reproduction signal S12 for the comparative voltage S12' in the comparator 23 is relatively low. Therefore, when a fluctuation in the amplitude of the reproduction signal S12 is caused, the window signal S16 may not be correctly outputted. Furthermore, in the optical memory apparatus such as the above-mentioned magneto-optical disc etc., the reproduction signal S12 includes low frequency components, and therefore, the above level margin is further decreased making the window signal S16 incorrect. Furthermore, for example, when a drop-out is caused in the reproduction signal S12 as indicated by circle F of FIG. 5, the pulse of the window signal S16 is not outputted, and the window is not present. Therefore, the detecting pulse does not appear in the reproduction data signal S18 although a pulse representing the peak appears in the peak detecting signal S17.

As apparent from the above, the conventional data detecting circuit 3 has such a disadvantage such that errors in detecting the reproduction data signal S18 are often caused when a fluctuation is caused in the amplitude of the reproduction signal, low frequency components are included in the reproduction signal, or a drop-out is caused.

SUMMARY OF THE INVENTION

An object of the present invention is to provide a digital signal reproduction apparatus which can avoid various errors due to amplitude fluctuation, low frequency components and drop-out contained in a reproduction signal.

According to the present invention, there is provided a digital signal reproduction apparatus comprising:

first comparing means for comparing a reproduction signal reproduced from a recording medium with a predetermined constant comparative voltage to output a first window signal;

first differential means for differentiating the reproduction signal to output a first order differential signal;

second differential means for differentiating the first order differential signal to output a second order differential signal;

second comparing means for comparing the second order differential signal with a predetermined level to output a second window signal;

peak detecting means for detecting a zero-cross point of the first order differential signal to output a peak detecting signal; and gate means for gating the peak detecting signal with the first and second window signals to output a reproduction data signal.

The peak detecting signal can be obtained by differentiating the reproduction signal and detecting the zero-cross point. The first window signal for gating the peak detecting signal can be obtained by the first comparing means.

The comparative voltage is used for detecting the amplitude of the reproduction signal and can be obtained from the direct current component by a comparative voltage generating circuit or may be obtained from a constant voltage regulated by a power supply unit. The first comparing means outputs the first window signal by comparing the reproduction signal with the comparative voltage. Since the comparative voltage is used for removing noise contained in the peak detecting signal by the first window signal, a relatively larger level margin can be set than the level margin of the comparative voltage generated by the conventional comparative voltage generating circuit.

The second window signal used for gating the peak detecting signal can be obtained by the second order differential means and the second comparing means.

When the first order differential signal is differentiated by the second differential means, the second order differential signal having a waveform whose maximum and minimum correspond to the zero-cross points of the first order differential signal can be obtained. Since the second order differential signal is a signal detected from the change in the amplitude of the first differential signal, the second differential signal is not affected substantially affected by the amplitude fluctuation and the low frequency component.

The second window signal representing the zero-cross points of the first differential signal can be obtained by comparing the second order differential signal with a predetermined value. If the peak point of the reproduction signal to be detected is a maximum point, the zero-cross point at which the first order differential signal changes from positive to negative corresponds to the peak point of the reproduction signal. Furthermore, when the predetermined value is set equal to a ground level, noises may be caused in the second window signal by the effect of the unstable portions of the first differential signal. However, such noise can be certainly removed by the first window signal.

Accordingly, since the first window signal is used for only removing noise which may be generated in the peak detecting signal, a relatively larger level margin of comparative voltage of the first comparing means can be used. Therefore, only noise in the reproduction signal is certainly removed without affecting the reproduction signal, the noise being due to the amplitude fluctuation, the low frequency components and the drop-out contained in the reproduction signal. Since the second window signal is generated from the second order differential signal, the second window signal is not affected by the amplitude fluctuation and the low components, and pulses of the second window signal are certainly outputted even if some drop-outs are contained in the reproduction signal. Therefore, since the peak detecting signal is gated with the first and second window signals, noise is certainly removed and only pulses corresponding to respective peak points of the reproduction signal are passed by the gate means where there is a dropout.

Therefore, even when the reproduction signal reproduced from the recording medium has amplitude fluctuation, low frequency components or drop-out, the correct reproduction data signal can be certainly obtained. For example, the reproduction signal reproduced from the recording medium such as a magneto-optical disc is often imposed with low frequency components, the correct reproduction data signal can be certainly obtained without the low frequency components.

DETAILED DESCRIPTION OF THE PREFERRED EMBODIMENT

A preferred embodiment will be described referring to FIGS. 1 to 3.

Figure 3:
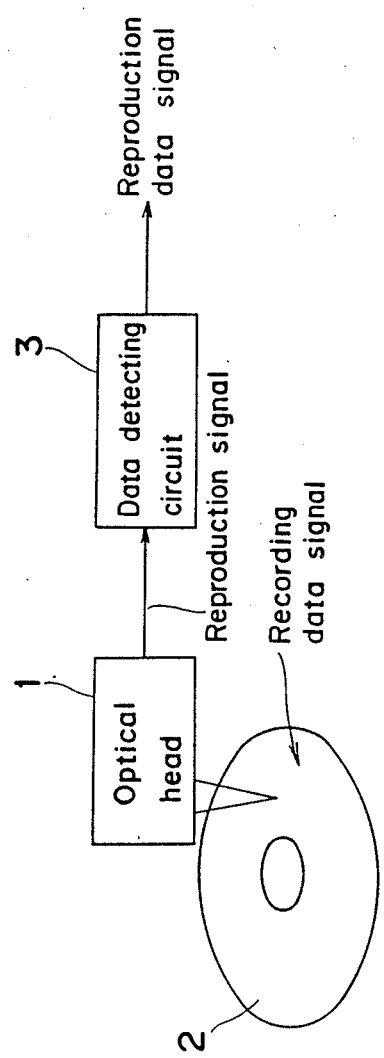
FIG. 3 is a schematic diagram showing the digital signal reproduction apparatus to which the present invention is applied.
Figure 4:
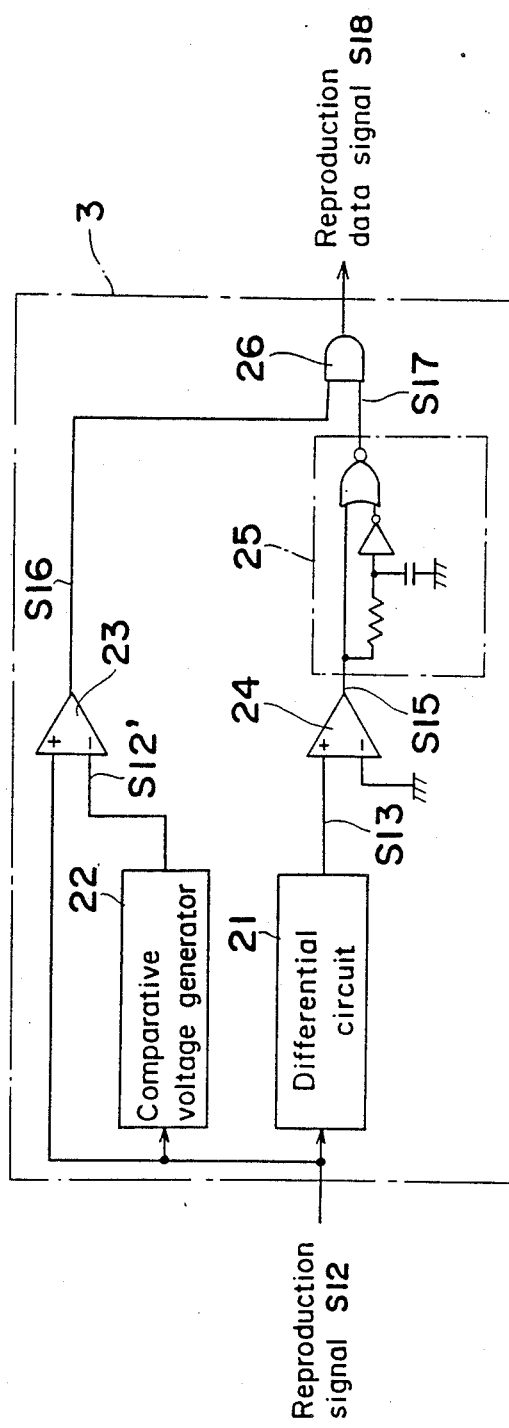
FIG. 4 is a schematic diagram of the data detecting circuit of the conventional digital signal reproduction apparatus.
Figure 5:
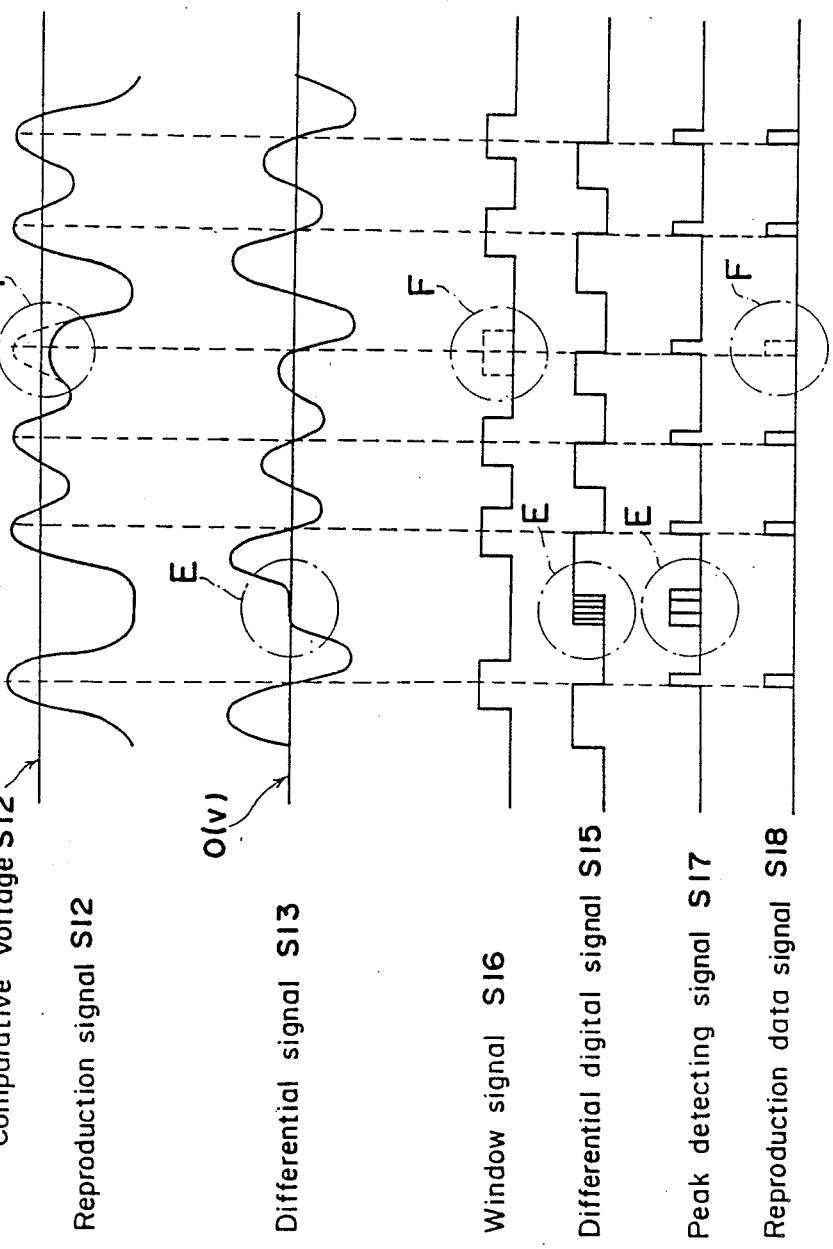
FIG. 5 is a timing chart showing waveforms of respective signals outputted from the circuits of the data detecting circuit of FIG. 4.

FIG. 3 is a schematic diagram of the magneto-optical disc apparatus of a preferred embodiment according to the present invention. In FIG. 3, an optical reading head 1 reads out data recorded on a magneto-optical disc 2 and outputs a reproduction signal S2 to a data detecting circuit 3.

Figure 1:
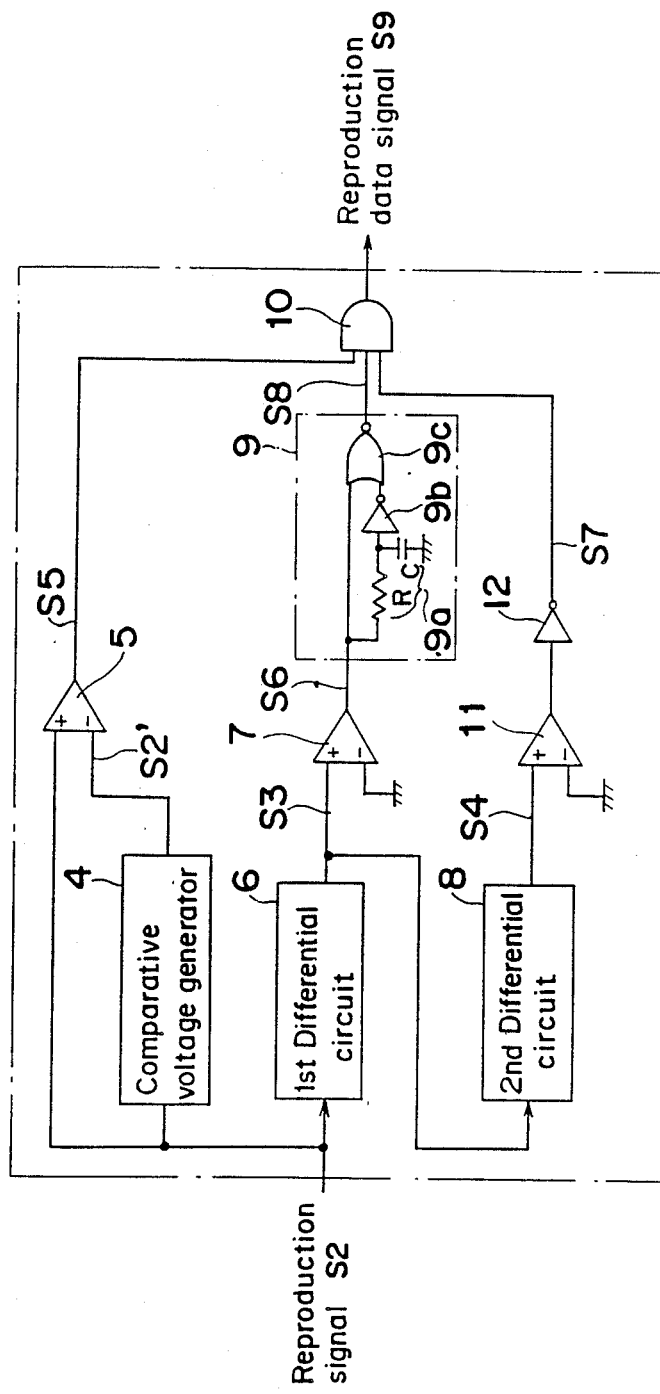
FIG. 1 is a schematic diagram of a data detecting circuit of a digital signal reproduction apparatus according to the preferred embodiment of the present invention.
Figure 2:
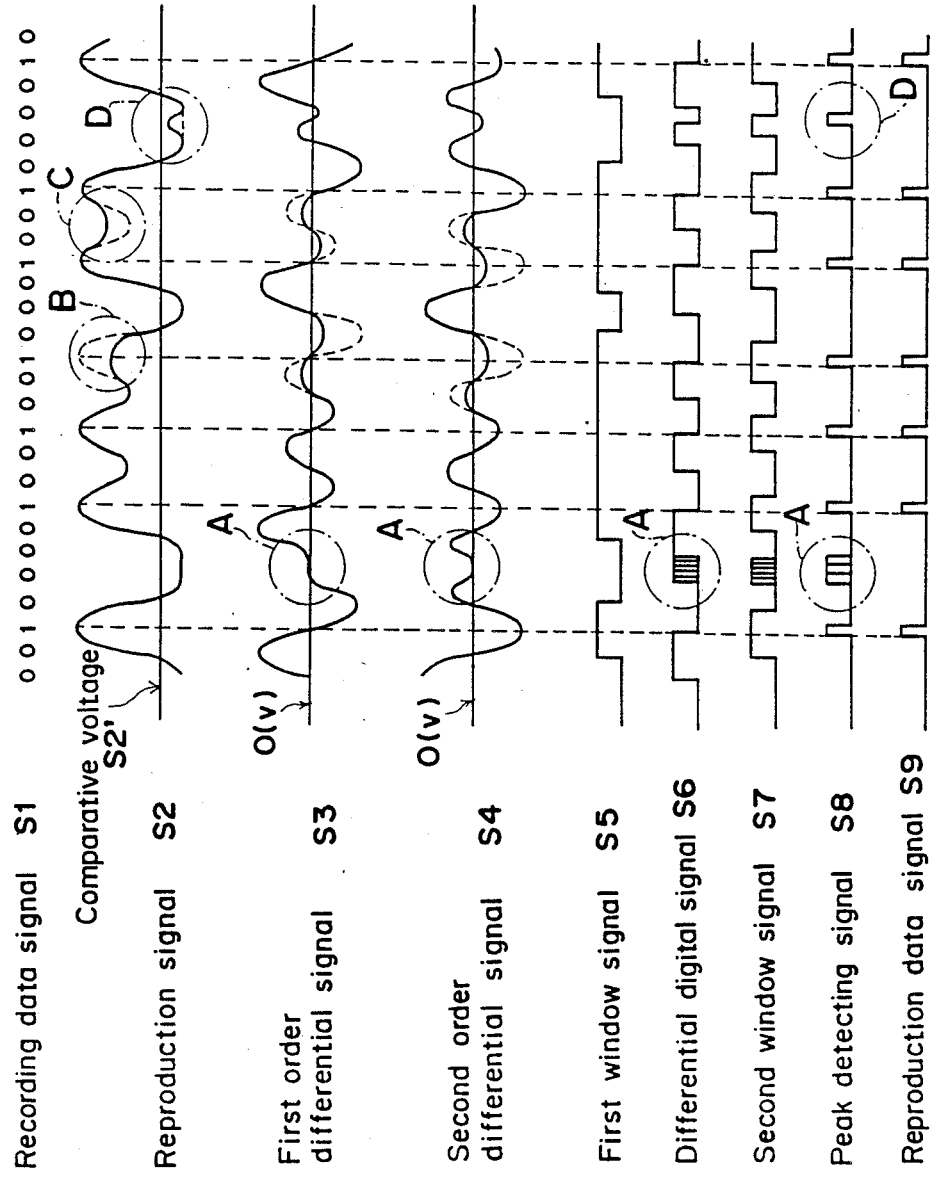
FIG. 2 is a timing chart showing waveforms of respective signals outputted from circuits of the data detecting circuit of the digital signal reproduction apparatus of FIG. 1.

FIG. 1 is a schematic diagram of the data detecting circuit 3. The reproduction signal S2 is inputted into input terminals of a comparative voltage generating circuit 4 and a differential circuit 6 and a non-inverted input terminal of an comparator 5, respectively.

The differential circuit 6 differentiates the reproduction signal and outputs a first order differential signal S3 to a non-inverted input terminal of a comparator 7 and an input terminal of another differential circuit 8, respectively. The inverted input terminal of the comparator 7 is connected to the ground. The comparator 7 compares the first order differential signal S3 with a 0 V level to output a differential digital signal S6 to an input terminal of a trailing detecting circuit 9. The trailing detecting circuit 9 comprises a time constant circuit 9a having a resistor R and a capacitor C, an inverter 9b, and a NOR gate 9c. In the trailing detecting circuit 9, the differential digital signal S6 is delayed by the time constant circuit 9a and inverted by the inverter 9b. The inverted signal is inputted into the input terminal of the NOR gate 9c. Also, the differential digital signal S6 is inputted directly to another input terminal of NOR gate 9c. The NOR gate 9c outputs a peak detecting signal S8 representing the trailing point of each pulse of the differential digital signal S6 to an input terminal of an AND gate 10. The composition of the trailing detecting circuit 9 is substantially the same as of the conventional one.

The comparative voltage generating circuit 4 is comprised of a low pass filter or an envelope detector and generates a comparative voltage S2' based on the reproduction signal S2. The comparative voltage S2' represents a threshold voltage for determining if the level of the reproduction signal S2 is not within the vicinity of the minimum level.

Alternatively, the comparative voltage generating circuit 4 may comprise a direct current reproduction circuit used for television set etc. and a slice level generating circuit. Namely, the maximum level or the minimum level is clamped at 0 V level by the direct current reproduction circuit and the clamped signal is sliced by the output of the slice level generating circuit. Alternatively, the comparative voltage generating circuit 4 may be constructed so as to output a constant voltage signal from a constant voltage source independent from the reproduction signal S2.

The output signal S2' from the comparative voltage generating circuit 4 is inputted into the inverted input terminal of the comparator 5. The comparator 5 compares the reproduction signal S2 with the comparative voltage S2' and outputs a first window digital signal S5 to second input terminal of the AND gate 10. The first window signal S5 is used for removing noise from the peak detecting signal S8 by masking the vicinity of the minimum voltage of the reproduction signal. Since the first window signal S5 masks only the vicinity of the minimum voltage of the reproduction signal S2, the comparative voltage S2' can be set so as to give a relatively large level margin. Therefore, the comparative voltage generating circuit 4 and the comparator 5 can output correct pulses of the first window signal S5 to open the AND gate 10 without any affecting the amplitude fluctuation, the low frequency components or the drop-out.

Another differential circuit 8 differentiates the first order differential signal S3 further and outputs the second order differential signal S4 to a non-inverted input terminal of a comparator 11. An inverted input terminal of the comparator 11 is connected to the ground. The comparator 11 compares the second order differential signal S4 with a 0 V voltage and outputs a digital signal S7 to the third input terminal of the AND gate 10 through an inverter 12. Alternatively, it is also possible to hold the inverted input terminal of the comparator 11 at a relatively small negative voltage to compare the second order differential signal S4 with the small negative voltage. The inverter 12 outputs an inverted signal of the output of the comparator 11 as a second window signal. When the relatively small negative voltage is used as the comparative voltage of the comparator 11, it becomes possible to remove noise generated at the zero-cross level of the first order differential signal S3 from the second window signal S7. The peak detecting signal S8 is gated by the AND gate 10 in accordance with the first and second window signals, and the AND gate 10 outputs the reproduction data signal S9.

The operation of the data detecting circuit 3 will be described referring to FIG. 2.

If the data signal S1 having "0" and "1" has been recorded on the magnetic thin film of the magneto-optical disc 2, the reproduction signal S2 is outputted as a wave form having peaks corresponding to "1". The reproduction signal S2 is differentiated by the differentiating circuit 6 and the first order differential signal S3 is outputted therefrom. The first order differential signal S3 has a waveform with zero-cross points corresponding to the maximum and minimum positions of the reproduction signal S2. The first order differential signal S3 is compared with a 0 V level by the comparator 7. The compared signal is outputted as a differential digital signal S6. The trailing position of each pulse of the differential digital signal S6 corresponds to a zero-cross point of the first order differential signal S3 which varies from a positive voltage to a negative voltage, and accordingly, corresponds to each maximum peak position of the reproduction signal S2. Namely, the trailing position of each pulse of the differential digital signal S6 corresponds to "1" of the recorded data signal S1. Therefore, a peak detecting signal S8 having pulses corresponding to "1" can be obtained by detecting trailing positions of the differential digital signal S6 with use of the trailing detecting circuit 9. However, it is to be noted that the peak detecting signal S8 includes noise caused by an unstable state of the first order differential signal as indicated by a circle A in FIG. 2 and/or errors due to drop-out of the reproduction signal S2 as indicated by a circle D in FIG. 2. However, the present system can be free from this noise and errors due to reasons as will be explained below.

The reproduction signal S2 is compared with the comparative voltage S2' by the comparator 5 to generate the first window signal S5. Since the comparative voltage S2' is set at a voltage slightly larger than the minimum of the reproduction signal S2, a relatively larger level margin can be set. Therefore, although the drop-outs are caused in the reproduction signal S2 as indicated by the circles B and C, the correct pulses of the reproduction data signal S9 can be certainly outputted by opening the window gate 10 without affecting the drop-outs. Further, at the minimum position in the reproduction signal S2 where a noise may be caused in the peak detecting signal S8 and at a peak portion caused by drop-out in the reproduction signal S2 wherein a detecting error may be caused in the peak detecting signal S9, the window gate 10 can be certainly shut. However, it is to be noted that error detection is not always avoided by using only the first window signal S5 since there is a possibility that the window is kept in an open state when the waveform of the reproduction signal S2 becomes a high level as a whole when levels of "0" and "1" are repeated alternatively in the recorded data signal S1. This problem is solved by utilizing the second order differential signal according to the present invention.

As stated above, the first order differential signal S3 is differentiated by the differential circuit 8. Since the second order differential signal S4 has a waveform showing only changes in the amplitude of the first order differential signal S3, the second order differential signal S4 is not substantially affected by the amplitude fluctuation and the low frequency components in the reproduction signal S2. The second differential signal S4 is compared with a 0 V level by the comparator 11, inverted by the inverter 12, and outputted as the second window signal S7. The output of the comparator 11 is a signal showing the vicinity of the zero-cross position whereas the first order differential signal varies from positive to negative corresponding to each of the peak positions of the reproduction signal S2. If the comparative voltage of the comparator 11 is set at a slightly small negative voltage, a noise of the second window signal S7, as shown in the circle A, can be removed in advance. As is apparent from the above, the second window signal S7 is not affected by the amplitude fluctuation and low frequency components. The correct pulse is outputted corresponding to the peak position of the reproduction signal S2 to open the window gate 10 even if drop-outs are caused in the reproduction signal S2 as indicated by circles B and C. However, when the peak of the reproduction signal S2 due to the drop-out is caused, the window by the second window signal S7 is opened. In this case, a possible error in detecting the peak detecting signal S8 is avoided by the first window signal S5. Further, since the comparative voltage of the comparator 11 is set at 0 V level in the construction of FIG. 1, the noise as shown in the circle A may be caused in the second window signal S7 as well as the peak detecting signal S8, but the noise is certainly removed by the first window signal S5.

The peak detecting signal S8 is gated by the AND gate 10 in accordance with the first window signal S5 and the second window signal S7. The AND gate 10 outputs the reproduction data signal S9.

Therefore, since the data detecting circuit 3 can gate the peak detecting signal S8 with both the first and second window signals, the detecting error of the peak point due to noise and/or drop-outs can be certainly avoided, and the reproduction data signal S9 can be obtained without affecting the amplitude fluctuation, low frequency components and drop-out in reproduction signal.

The preferred embodiments described above are illustrative and not restrictive, the scope of the invention being indicated by the appended claims and all variations which come within the meanings of the claims are intended to be embraced herein.

What is claimed is:

1. A digital signal reproduction apparatus for reproducing data from a magneto-optical disk, comprising:
   comparative voltage generating means for generating a comparative voltage according to a reproduction signal reproduced from the magneto-optical disk;
   first comparing means, operatively connected to said comparative voltage generating means, for comparing said reproduction signal with said comparative voltage and for outputting a first window signal according to the comparison;
   first differential means, operatively connected to said first comparing means, for differentiating said reproduction signal and outputting a first order differential signal;
   second differential means, operatively connected to said first differential means, for differentiating said first order differential signal and outputting a second order differential signal;
   second comparing means, operatively connected to said second differential means, for comparing said second order differential signal with a predetermined level and outputting a second window signal according to the comparison;
   peak detecting means, operatively connected to said first differential means, for detecting a zero-cross point in said first order differential signal and outputting a peak detecting signal; and
   gate means, operatively connected to said peak detecting means and said first and second comparing means, for gating said peak detecting signal with said first and second window signals and outputting a reproduction data signal substantially without influence from noise.

2. The apparatus as claimed in claim 1, wherein said peak detecting means comprises a comparator for comparing said first order differential signal with a predetermined level and a trailing detecting circuit for detecting each trailing point of an output from said comparator.

3. The apparatus as claimed in claim 2, wherein said trailing detecting circuit comprises an inverter for inverting the delayed signal and a NOR gate for gating the delayed signal with the inverted signal to output a trailing detecting signal.

* * * * *